(12) United States Patent
Okino

(10) Patent No.: US 9,802,468 B2
(45) Date of Patent: Oct. 31, 2017

(54) DOOR WEATHER STRIP

(71) Applicant: NISHIKAWA RUBBER CO., LTD., Hiroshima-shi, Hiroshima-ken (JP)

(72) Inventor: Fumito Okino, Hiroshima (JP)

(73) Assignee: NISHIKAWA RUBBER CO., LTD., Hiroshima-Shi (JP)

(*) Notice: Subject to any disclaimer, the term of this patent is extended or adjusted under 35 U.S.C. 154(b) by 0 days.

(21) Appl. No.: 15/212,870

(22) Filed: Jul. 18, 2016

(65) Prior Publication Data

US 2017/0028829 A1  Feb. 2, 2017

(30) Foreign Application Priority Data

Jul. 30, 2015 (JP) .................. 2015-150441

(51) Int. Cl.

| | |
|---|---|
| *B60J 10/248* | (2016.01) |
| *B60J 5/04* | (2006.01) |
| *E06B 7/23* | (2006.01) |
| *B60J 10/277* | (2016.01) |
| *B60J 10/86* | (2016.01) |

(52) U.S. Cl.
CPC .............. *B60J 10/248* (2016.02); *B60J 5/04* (2013.01); *B60J 10/277* (2016.02); *B60J 10/86* (2016.02); *E06B 7/23* (2013.01)

(58) Field of Classification Search
CPC .............. B60J 10/248; B60J 5/04; E06B 7/23
USPC ............................................. 49/498.1, 495.1
See application file for complete search history.

(56) References Cited

U.S. PATENT DOCUMENTS

| | | | | |
|---|---|---|---|---|
| 5,067,280 A * | 11/1991 | Arima | .................. | B29C 47/0028 49/498.1 |
| 6,250,018 B1 * | 6/2001 | Kawai | ...................... | B60J 10/22 49/475.1 |
| 6,405,489 B1 * | 6/2002 | Miura | ...................... | B60J 10/24 49/475.1 |
| 8,402,696 B2 * | 3/2013 | Iwasa | ..................... | B60J 10/248 296/146.9 |
| 2002/0178656 A1 * | 12/2002 | Nozaki | ............. | B29C 45/14409 49/441 |
| 2004/0261322 A1 * | 12/2004 | Baratin | ................... | B60J 10/24 49/498.1 |
| 2006/0230686 A1 * | 10/2006 | Plum | ...................... | B60J 5/0405 49/498.1 |
| 2007/0245635 A1 * | 10/2007 | Deguchi | ................ | B60J 10/248 49/498.1 |

(Continued)

FOREIGN PATENT DOCUMENTS

JP  5634344 B2  12/2014

*Primary Examiner* — Gregory Strimbu
(74) *Attorney, Agent, or Firm* — Robert P. Michael, Esq.; Carter, DeLuca, Farrell & Schmidt, LLP

(57) ABSTRACT

A door weather strip includes an installation base member operatively coupled on a peripheral edge of a door of an automobile and a hollow seal member integrally molded with an inner-cabin side of the installation base member. The hollow seal member makes elastic contact with a door opening edge of a body when the door is in a closed position. A prop forms a part of a wall of the hollow seal member. The prop is substantially linear in cross section and has a first protrusion formed on an end thereof. The protrusion protrudes toward the door and makes elastic contact with a panel of the door.

4 Claims, 4 Drawing Sheets

(56) References Cited

U.S. PATENT DOCUMENTS

| | | | | |
|---|---|---|---|---|
| 2008/0122250 A1* | 5/2008 | Lichter | ...................... | B60J 5/06 296/146.9 |
| 2009/0000206 A1* | 1/2009 | Okajima | .................. | B60J 10/24 49/493.1 |
| 2015/0266364 A1* | 9/2015 | Im | ........................ | B60J 10/0017 49/495.1 |

* cited by examiner

DOOR WEATHER STRIP

CROSS REFERENCE TO RELATED APPLICATION

This application claims the benefit under 35 USC §119 of JP Patent Application JP 2015-150441 filed Jul. 30, 2015, the entire disclosure of which is incorporated herein by reference.

BACKGROUND INFORMATION

The present invention relates to door weather strips operatively coupled along peripheral edges of automobile doors for sealing gaps between doors and bodies by making elastic contact with the bodies of the automobiles.

As shown in FIG. 7 and FIG. 8, a door weather strip 10 has been operatively coupled along a peripheral edge of a door 1 (front door 1F, rear door 1R) of an automobile for sealing a gap between the door 1 and an automobile body opening edge of a body 2.

As shown in FIG. 7, the door weather strip 10 is formed by connecting die molded parts 71, 72, 73, 74 to extrusion molded parts 61, 62, 63, 64. The extrusion molded parts 62, 64 are operatively coupled on an upper part (roof side) of the peripheral edge of the door 1. The die molded parts 71, 72, 73, 74 are operatively coupled on upper corner parts which are continuous with the extrusion molded parts 62, 64.

As shown in FIG. 8, the door weather strip 10 includes: an installation base member 11 operatively coupled on the peripheral edge of the door 1; and a hollow seal member 12 which is integrally molded with the installation base member 11 and makes elastic contact with a door opening edge of the body 2 when the door 1 is in a closed position. A seal lip 13 protrudes from a position between the installation base member 11 and the hollow seal member 12 and a top end of the seal lip 13 makes elastic contact with the peripheral edge of the door 1.

There have been demands for increase in reaction force of the door weather strip 10. But, when a cross-sectional reaction force is increased around the whole door weather strip 10 on the door 1, the resultant door weather strip 10 degrades door closability.

In this connection, as shown in FIG. 8, the door weather strip 10 has been partially modified depending on necessity, by providing a pad 15 in the hollow seal member 12 or by adjusting thickness of a hollow wall forming the hollow seal member 12. Partial modifications have been performed on parts of the door weather strip 10, which face difference in level on the door opening edge of the body 2, for example.

But, providing the pad 15 increases cost and lowers productivity. Also, partially adjusting thickness of the hollow seal member 12 affects an outside diametral shape of the hollow seal member 12, degrades appearance, and hardly controls the reaction force.

In this connection, providing a plurality of protrusions on sealing surfaces of the hollow seal members has been known for preventing appearance of triangular spaces (see, for example, Japanese examined Patent Publication No. 5634344). In the structure, the protrusions are made of highly foamed sponge of materials which are different from that of the hollow seal members.

Unfortunately, however, it is very difficult to manufacture the door weather strips while meeting conditions that: the plurality of the protrusions are accurately provided on appropriate positions on the sealing surfaces of the hollow seal members; and the plurality of the protrusions are made of the highly foamed sponge of the materials which are different from that of the hollow seal members.

Accordingly, an object of the present invention is to provide the door weather strips capable of improving sealing performance on appropriate positions by simply transforming cross-sectional shapes of the hollow seal members.

SUMMARY

In order to achieve the above-mentioned object, according to one aspect of the invention, a door weather strip (30) is provided, the door weather strip (30) including: an installation base member (31) operatively coupled on a peripheral edge of a door (1) of an automobile; and a hollow seal member (32) integrally molded with an inner-cabin side of the installation base member (31), the hollow seal member (32) making elastic contact with a door opening edge of a body (2) when the door (1) is in a closed position, wherein:

a prop (50) forms a part of a hollow wall of the hollow seal member (32), the prop (50) being substantially linear in cross section, the prop (50) extending in an inner and outer cabin direction when the door (1) is in the closed position, the prop (50) having a first protrusion (51) formed on a first end thereof, the first protrusion (51) protruding toward the door (1) from a part which closes the hollow wall, and the first protrusion (51) making elastic contact with a panel (1a) of the door (1).

In addition, according to an aspect of the present invention, the prop (50) has a second protrusion formed on a second end thereof, the second protrusion extending toward an outer circumference of the door (1) from the part which closes the hollow wall.

In addition, according to an aspect of the present invention, thickness (70) of the prop (50) is thicker than thickness of at least one other part of the hollow wall of the hollow seal member (32).

In addition, according to an aspect of the present invention, length (60) of the first protrusion (51) is adjusted and extended to a position on which the first protrusion (51) makes elastic contact with the panel (1a) of the door (1).

Symbols in parentheses show constituents or items corresponding to the drawings.

According to the present invention, the prop forms the part of the hollow wall of the hollow seal member of the door weather strip. The prop is substantially linear in cross section and extends in the inner and outer cabin direction when the door is in the closed position. The first end of the prop protrudes toward the door from the part which closes the hollow wall and makes elastic contact with a door panel. Accordingly, when the hollow seal member makes elastic contact with the door opening edge of the body and bends, the prop which makes elastic contact with the door panel supports the hollow seal member, and reaction force of the hollow seal member is increased.

As pressing force of the hollow seal member is increased with respect to the door opening edge of the body, the door weather strip can seal positions with difference in level on the door opening edge of the body without making a gap between the hollow seal member and the door opening edge of the body and prevent water leak, and does not degrade door closability.

These effects are achieved by partially forming the hollow wall with the prop which is substantially linear in cross section. Also, the prop of the hollow wall can be shaped simply by extrusion molding. Accordingly, expensive pads need not be provided as in the prior art.

In addition, the second protrusion is formed on the second end of the prop. The second protrusion extends toward the outer circumference of the door. Accordingly, when the door is in the closed position, the second end of the prop makes elastic contact with the body without fail while the first end of the prop makes elastic contact with the door panel without fail. As a result, the prop supports the hollow seal member more securely.

In addition, the thickness of the prop is thicker than the thickness of at least one other part of the hollow wall of the hollow seal member. Accordingly, when the door is in the closed position, the prop stably supports the hollow seal member.

In addition, the length of the first protrusion is adjusted, by gradually-changing molding during extrusion molding for example, and is extended to the position on which the first protrusion makes elastic contact with the panel of the door. Accordingly, the reaction force can be simply increased within a limited part of the hollow seal member. Alternatively, the door panel facing the first protrusion may be deformed and rise to make elastic contact with the first protrusion while the length of the first protrusion remains unchanged. Also, a separate protrusion may be provided extra.

DETAILED DESCRIPTION

Figure 1:
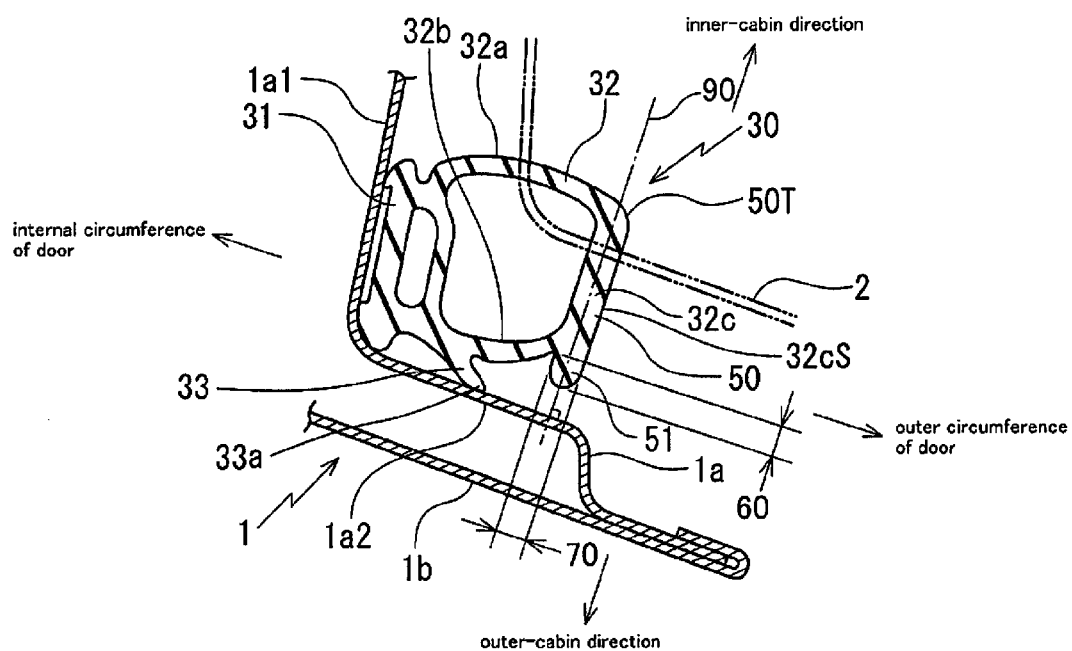
FIG. 1 is an I-I line enlarged cross section of FIG. 7, showing a door weather strip according to an embodiment of the present invention.
Figure 2:
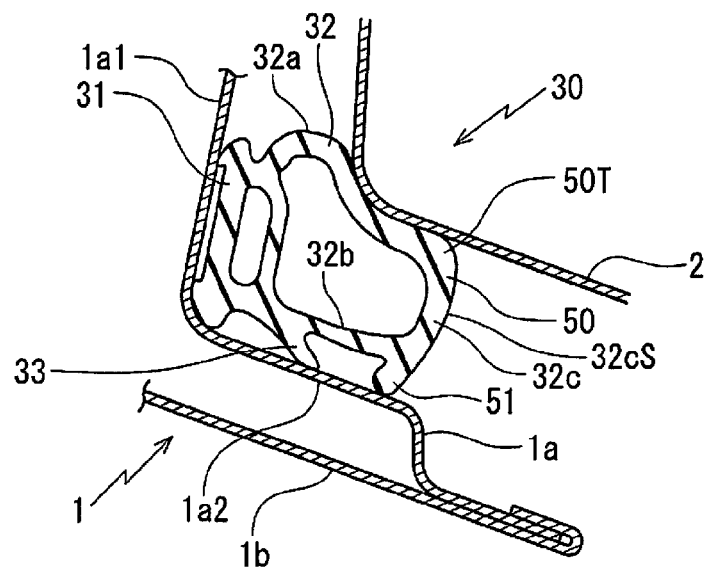
FIG. 2 is an I-I line enlarged cross section of FIG. 7, showing a state that the door weather strip of FIG. 1 makes elastic contact with a door opening edge of a body.
Figure 7:
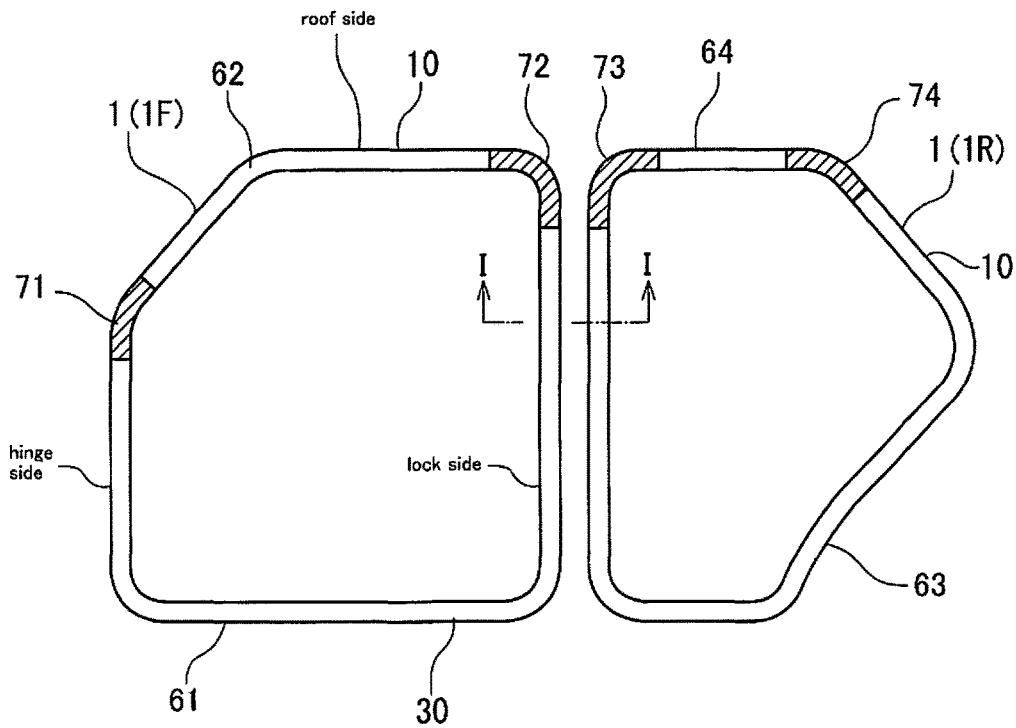
FIG. 7 is a side view of appearance of the door weather strip operatively coupled on an automobile door.
Figure 8:
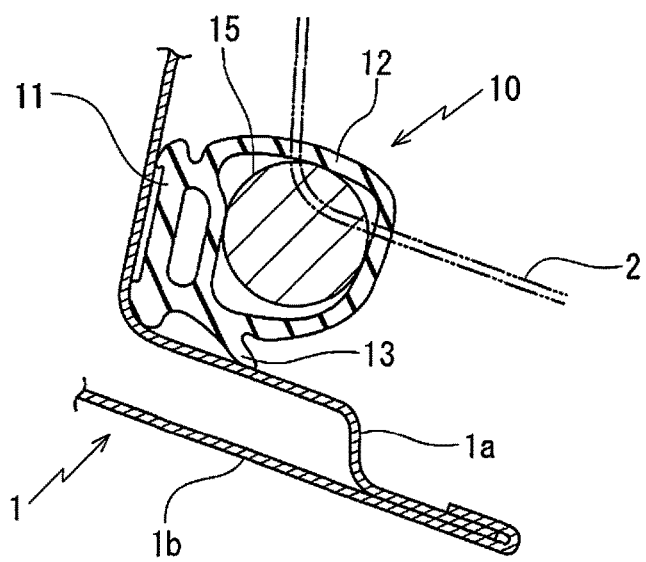
FIG. 8 is an I-I line enlarged cross section of FIG. 7, showing a door weather strip according to a prior art.

Referring to FIG. 1 and FIG. 2, a door weather strip 30 according to an embodiment of the present invention will be described. In the embodiment, the door weather strip 30 is applied to an extrusion molded part 61 (FIG. 7) of a front door 1.

The door weather strip 30 according to the embodiment of the present invention is operatively coupled along a peripheral edge of a door 1 of an automobile. The door weather strip 30 in FIG. 1 and FIG. 2 is on a position (lock side) which is: at a substantial center in a front and rear direction of an automobile body; lower than a roof in a vertical direction; and slightly higher than a belt line. The door weather strip 30 is operatively coupled on a corner on an inner-cabin side of a door inner panel 1a of the front door 1, which is folded by substantially 90 degrees. A body 2 includes a surface which is folded by substantially 90 degrees and arranged substantially in parallel with the door inner panel 1a.

The door weather strip 30 mainly includes an installation base member 31, a hollow seal member 32, and a seal lip 33, which are made of ethylene-propylene-diene rubber (EPDM), thermoplastic elastomer, or the like.

The installation base member 31 is operatively coupled on a vertically formed surface 1a1 (surface which extends in an inner and outer cabin direction when the door is in the closed position) of the door inner panel 1a by a clip or a double-sided adhesive tape not shown. The vertically formed surface 1a1 is perpendicular to a door surface (external surface of the door).

The hollow seal member 32 is integrally molded with the installation base member 31 and has a convex shape toward an outer circumference of the door 1. The hollow seal member 32 includes: an inner-cabin side seal wall 32a which rises from a vicinity of an inner-cabin side end of the installation base member 31; an outer-cabin side seal wall 32b which rises from a vicinity of an outer-cabin side end of the installation base member 31; and a connecting seal wall 32c which connects the inner-cabin side seal wall 32a and the outer-cabin side seal wall 32b. As the door 1 approaches a closed position, the inner-cabin side seal wall 32a comes into contact with a corner of the body 2 first, and then the hollow seal member 32 makes elastic contact with the a door opening edge of the body 2.

The seal lip 33 has a substantially tongue-shaped cross section and extends toward a base surface 1a2 (surface which extends in a front and rear direction when the door is in the closed position) of the door inner panel 1a from the outer-cabin side seal wall 32b. A top end 33a makes elastic contact with the base surface 1a2 of the door inner panel 1a. The seal lip 33 may be omitted.

A first protrusion 51 having shape of a lip is formed on an outer-cabin side end of the connecting seal wall 32c. More specifically, the first protrusion 51 protrudes continuously from a part which closes the hollow wall toward the base surface 1a2 of the door inner panel 1a of the door 1 and makes elastic contact with the base surface 1a2. An outer surface 32cS of the connecting seal wall 32c of the hollow seal member 32 is continuous with a top end of the first protrusion 51. The connecting seal wall 32c and the first protrusion 51 are continuous with each other and form a prop 50 which is substantially linear. An inner-cabin side end 50T of the prop 50 (inner-cabin side end of the connecting seal wall 32c) and an outer-cabin side end (top end of the first protrusion 51) are on an axis 90 which is substantially linear. The axis 90 runs through an interior of the connecting seal wall 32c and the first protrusion 51. The axis 90 is substantially at right angles with the base surface 1a2 of the door inner panel 1a. A distance is longer between the installation base member 31 and the prop 50 or the axis 90 than a distance between the installation base member 31 and at least one other part. The prop 50 and the axis 90 are substantially in parallel with the installation base member 31. As shown in FIG. 1, when the door 1 is open, the first protrusion 51 does not abut with the base surface 1a2, in other words, a gap is sandwiched between the first protrusion 51 and the base surface 1a2. As shown in FIG. 2, when the door is in the closed position, the first protrusion 51 makes elastic contact with the base surface 1a2. In the present embodiment, the part which closes the hollow wall has a substantially trapezoidal-shaped cross section. But the part which closes the hollow wall may be substantially rectangular, substantially triangular, substantially circular, substantially polygonal or the like in cross section.

When the hollow seal member 32 makes elastic contact with the door opening edge of the body 2 and bends while the door 1 is in the closed position as shown in FIG. 2, the inner-cabin side seal wall 32a of the hollow seal member 32 abuts with the door opening edge of the body 2 and the first protrusion 51 makes elastic contact with the base surface 1a2 of the inner panel 1a. As a result, the prop 50 supports the hollow seal member 32, and reaction force of the hollow seal member 32 is increased.

Thickness 70 of the prop 50 (thickness of the part which closes the hollow wall, which is thickness of the connecting seal wall 32c) is thicker than the thickness of at least one other part of the hollow wall of the hollow seal member 32. Accordingly, when the door 1 is in the closed position, the prop 50 does not bend deeply and stably supports the hollow seal member 32.

As pressing force of the hollow seal member 32 is increased with respect to the door opening edge of the body 2, the door weather strip can seal positions with difference in level on the door opening edge of the body 2 without making a gap between the hollow seal member 32 and the door opening edge of the body 2 and prevent water leak.

In the present embodiment, the thickness 70 of the prop 50 is substantially the same from a side of the door opening edge of the body 2 to the first protrusion 51 on the side of the door inner panel 1a. But the thickness 70 of the prop 50 may be reduced on the side of the first protrusion 51 or increased. Also, the first protrusion 51 may be gradually increased in the thickness toward a top end.

Figure 3:
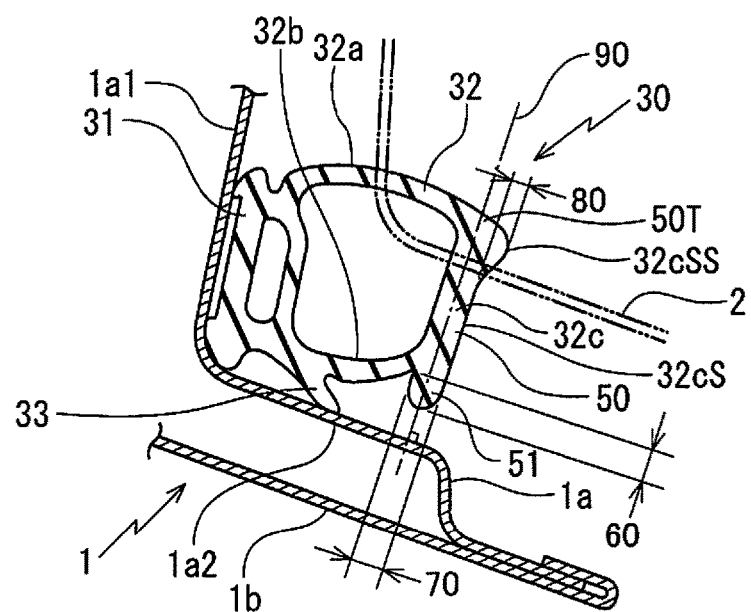
FIG. 3 is an I-I line enlarged cross section of FIG. 7, showing another door weather strip according to the embodiment of the present invention.
Figure 4:
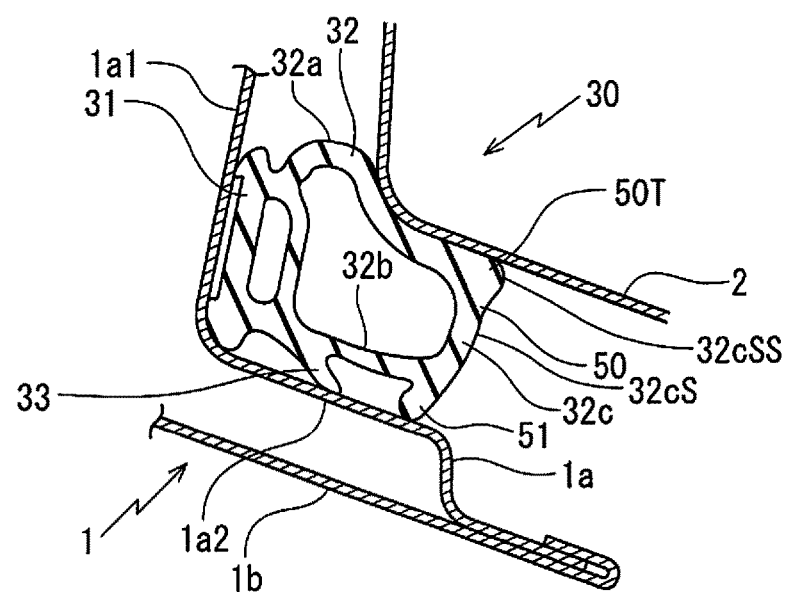
FIG. 4 is an I-I line enlarged cross section of FIG. 7, showing a state that the door weather strip of FIG. 3 makes elastic contact with the door opening edge of the body.

Alternatively, as shown in FIG. 3 and FIG. 4, thickness of the prop 50 may be thicker on the side of the door opening edge of the body 2 than the thickness 70. Also, a thick part 80 (second protrusion) may extend toward an outer side of the hollow wall. In case the thickness of the inner-cabin side end 50T of the prop 50 is thicker than the thickness 70, when the door 1 is in the closed position, the inner-cabin side end 50T of the prop 50 makes elastic contact with the body 2 without fail while the top end of the first protrusion 51 strongly makes elastic contact with the base surface 1a2 of the inner panel 1a. As a result, the resultant reaction force presses the inner-cabin side end 50T of the prop 50 against the door opening edge of the body 2 more securely.

An outer surface 32cSS of the thick part 80 (second protrusion) extends toward the outer side and forms a gentle surface which is continuous with the first protrusion 51 via the outer surface 32cS at a center of the prop 50.

In addition, length 60 of the first protrusion 51 may be adjusted by gradually-changing molding during extrusion molding. In case specific positions (difference in level on joints between two panels at the door opening edge of the body 2, for example) of the door opening edge of the body 2 require an increased pressing force for sealing from the hollow sealing member 32, the length 60 of a part of the first protrusion 51 may be longer. As a result, when the door 1 is in the closed position, the first protrusion 51 makes elastic contact with the inner panel 1a of the door 1 without fail. In other words, the length 60 of at least one other part of the first protrusion 51, other than the longer part, is shorter and does not abut with the inner panel 1a of the door 1 when the door 1 is in the closed position. Accordingly, the reaction force is increased within the limited part of the hollow seal member 32 of the door weather strip 30. In other words, the hollow seal member 32 is not strongly pressed against the door opening edge of the body 2 around the whole door weather strip 30. The structure does not degrade door closability.

Figure 5:
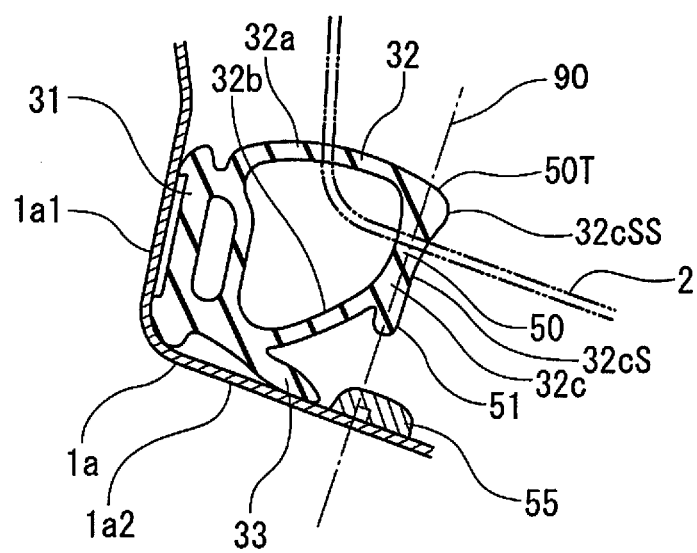
FIG. 5 is an I-I line enlarged cross section of FIG. 7, showing a structure of still another door weather strip according to the embodiment of the present invention.
Figure 6:
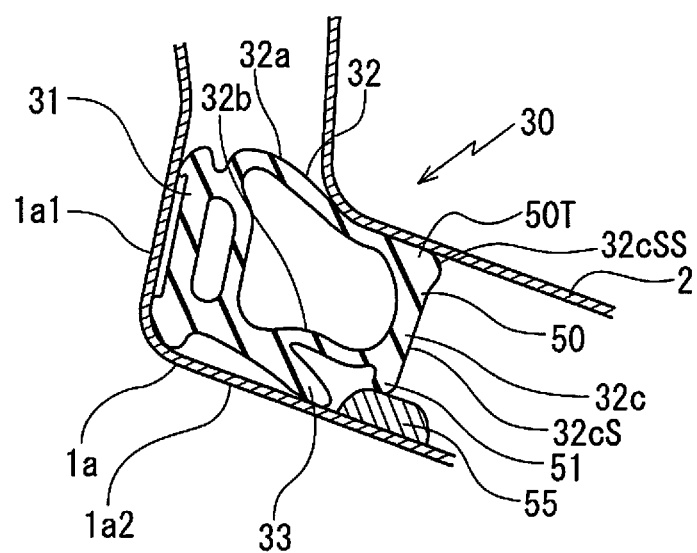
FIG. 6 is an I-I line enlarged cross section of FIG. 7, showing a state that the door weather strip of FIG. 5 makes elastic contact with the door opening edge of the body.

Alternatively, the base surface 1a2 of the inner panel 1a facing the first protrusion 51 may be deformed in part and rise to make elastic contact with the first protrusion 51 while the length 60 of the first protrusion 51 remains unchanged. Also, as shown in FIG. 5 and FIG. 6, a separate protrusion 55 may be provided extra on the base surface 1a2 for the first protrusion 51 to make elastic contact with. The structure also increases the reaction force within the limited part of the hollow seal member 32, does not allow the gap on an uneven position of the body 2 or does not degrade the door closability. In FIG. 5 and FIG. 6, the thick part 80 (second protrusion) is formed which extends toward the outer side from the inner-cabin side end 501 of the prop 50, but as shown in FIG. 1 and FIG. 2, the thick part 80 (second protrusion) may be omitted.

FIG. 1 to FIG. 6 show a lock side of the door. But the extrusion molded part 61 (FIG. 7) extends to a hinge side of a front door 1. More specifically, the hinge side is on a position on a front side surface of the front door 1 relative to the automobile, which is higher than a bottom part of the front door 1. On the hinge side of the door 1, for example, when the door 1 is in the closed position, the outer surface 32cS of the connecting seal wall 32c of the hollow seal member 32 abuts with the door opening edge of the body 2. In this case, two positions (two points) on the outer surface 32cS in FIG. 1, around the inner-cabin side end 501 and around a base root of the first protrusion 51, may touch the door opening edge of the body 2, and sealing pressure of the two positions may vary. But when the thick part 80 (second protrusion) is formed which extends toward the outer side, only one position (one point) on the outer surface 32cSS of the thick part 80 (second protrusion) which extends toward the outer side touches the door opening edge of the body 2. The structure performs a sufficient sealing performance on the hinge side.

I claim:

1. A door weather strip comprising:
   an installation base member configured to operably couple to a peripheral edge of a door of an automobile, said installation base member having an inner-cabin side facing a body of the automobile and an outer-cabin side opposite the inner-cabin side; and
   a hollow seal member integrally molded with the inner-cabin side of the installation base member, the hollow seal member configured to make elastic contact with a door opening edge of the body of the automobile when the door is in a closed position, the hollow seal member including:
   an inner-cabin side seal wall which extends from an inner-cabin end of the installation base member;
   an outer-cabin side seal wall which extends from an outer-cabin end of the installation base member;
   a connecting seal wall which connects the inner-cabin side seal wall and the outer-cabin side seal wall; and
   said connecting seal wall having a first protrusion protruding toward said door from a first end of said connecting seal wall, said connecting seal wall and said first protrusion being substantially co-linear in cross section and substantially parallel with the installation base member when the door is in an open position, the connecting seal wall extending in an inner-cabin and outer-cabin direction when said door is in the closed position, and the first protrusion configured to be spaced from a panel of said door when the door is in the open position and to make elastic contact with the panel of said door when said door is in said closed position.

2. The door weather strip as claimed in claim 1, wherein: the connecting seal wall has a second protrusion extending from a second end of the connecting seal wall opposite the first end.

3. The door weather strip as claimed in claim 2, wherein: a thickness of said connecting seal wall is thicker than a thickness of each of said inner-cabin side seal wall and said outer-cabin side seal wall.

4. The door weather strip as claimed in claim 1, wherein: a thickness of said connecting seal wall is thicker than a thickness of each of said inner-cabin side seal wall and said outer-cabin side seal wall.

* * * * *